United States Patent
Bonnet et al.

(10) Patent No.: US 8,148,850 B2
(45) Date of Patent: Apr. 3, 2012

(54) DEVICE FOR BALANCING THE POWER SUPPLIED BY POWER GENERATORS

(75) Inventors: Guillaume Bonnet, Bazus (FR); David Rousset, Toulouse (FR)

(73) Assignee: Airbus Operations, Toulouse (FR)

( * ) Notice: Subject to any disclaimer, the term of this patent is extended or adjusted under 35 U.S.C. 154(b) by 0 days.

(21) Appl. No.: 12/532,705

(22) PCT Filed: Mar. 25, 2008

(86) PCT No.: PCT/FR2008/050509
§ 371 (c)(1),
(2), (4) Date: Mar. 30, 2011

(87) PCT Pub. No.: WO2008/132401
PCT Pub. Date: Nov. 6, 2008

(65) Prior Publication Data
US 2011/0169327 A1    Jul. 14, 2011

(30) Foreign Application Priority Data
Mar. 26, 2007    (FR) ...................................... 07 54034

(51) Int. Cl.
*H02J 1/00*    (2006.01)
*H02J 3/00*    (2006.01)
(52) U.S. Cl. .......................................... 307/82; 307/9.1
(58) Field of Classification Search .................... 307/9.1, 307/45, 58, 82; 323/272
See application file for complete search history.

(56) References Cited

U.S. PATENT DOCUMENTS

| | | | |
|---|---|---|---|
| 7,781,909 B2 * | 8/2010 | Ozawa et al. | 307/39 |
| 2002/0135338 A1 | 9/2002 | Hobrecht | |
| 2005/0001597 A1 | 1/2005 | Walters | |

FOREIGN PATENT DOCUMENTS

WO    2006122235 A    11/2006

OTHER PUBLICATIONS

International Search Report dated Dec. 16, 2008.
Written Opinion of the International Search Authority dated Dec. 16, 2008.

* cited by examiner

*Primary Examiner* — Jared Fureman
*Assistant Examiner* — Carlos Amaya
(74) *Attorney, Agent, or Firm* — Perman & Green, LLP (57) ABSTRACT

A device for balancing power generators, including a plurality of converters each including an elementary conversion cell with a switch driven by a comparator that receives a ramp on one input thereof and, on another input, a voltage from a driving amplifier wherein the driving amplifiers receive on their negative input an image of the cell current and have their positive input connected to an adjustment loop including a common path CS_Bus, and wherein the CS_Bus path directly connects the positive inputs of the driving amplifiers to the outputs of transconductance amplifiers associated with the elementary conversion cells.

12 Claims, 8 Drawing Sheets

Prior Art

Fig. 1

Prior Art

Fig. 2

Prior Art

Fig. 3A

Prior Art

Fig. 3B

Prior Art

Fig. 4

Prior Art

Fig. 5

Prior Art

Prior Art

DEVICE FOR BALANCING THE POWER SUPPLIED BY POWER GENERATORS

CROSS-REFERENCE TO RELATED APPLICATIONS

This application is the National Stage of International Application No. PCT/FR2008/050509 filed on 25 Mar. 2008, which designated the United States of America, and which international application was published as Publication No. WO2008/132401 A2, which claims priority to French Application No. 07 54034 filed on 26 Mar. 2007, both of which are incorporated by reference in their entirety.

BACKGROUND

This aspects of the disclosed embodiments concern a device for balancing the power supplied by electric generators that is particularly applicable to connecting such generators in parallel to supply power to an aircraft power-supply system.

Hydraulic generators with limited power are used to supply an aircraft flight control computer, and if a computer needs 100 W of power and four generators that can supply 25 W, full power must be drawn from each of the generators and done so in a balanced way.

However, it is not possible to connect such generators in parallel, and it is known that to have the currents supplied accumulate, such generators must be combined with DC/DC voltage converters that lower the voltage (DC/DC Buck converters in English) composed of regulation loops, so that the converter outputs can then be connected in parallel.

SUMMARY

Figure 1:
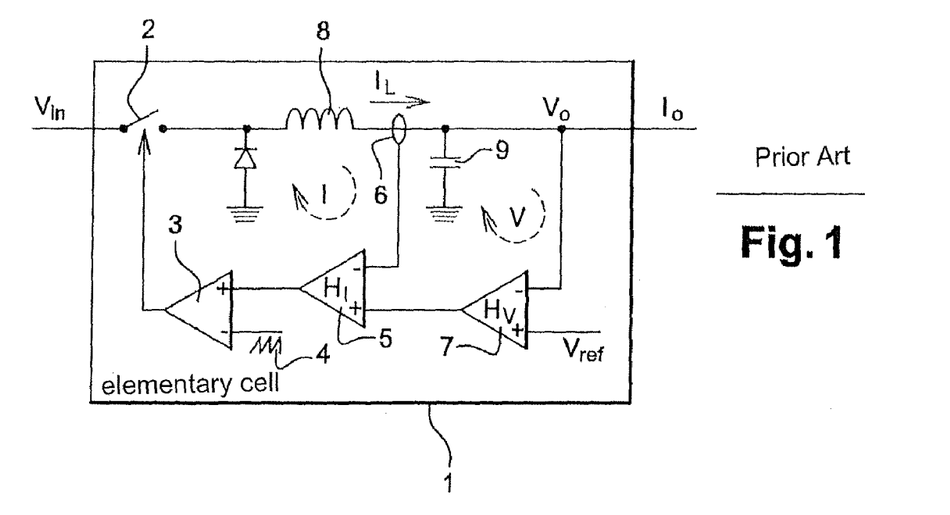
FIG. 1 shows a schematic view of the elementary converter cell discussed above.

The usual converters are based on an elementary conversion cell 1 for which a general diagram is shown in FIG. 1.

Such a cell includes a switch 2 controlled by a first comparator 3 that receives on its inputs a sawtooth ramp 4 and a voltage that comes from an operational amplifier 5 and corresponds to the measurement of the difference between a measurement 6 of the charge current $I_L$ of the cell smoothed by a self-filter device 8 and a capacitor 9, and an error voltage generated by a second amplifier 7 that receives on its inputs the output voltage $V_o$ of the cell and a reference voltage $V_{ref}$.

To couple several converter cells and connect their outputs in parallel, several types of regulation loops are known.

The various diagrams resulting from these prior art solutions are shown in FIGS. 2 to 8 marked prior art.

These diagrams concern two embodiments of regulation loops that are used in particular.

Figure 2:
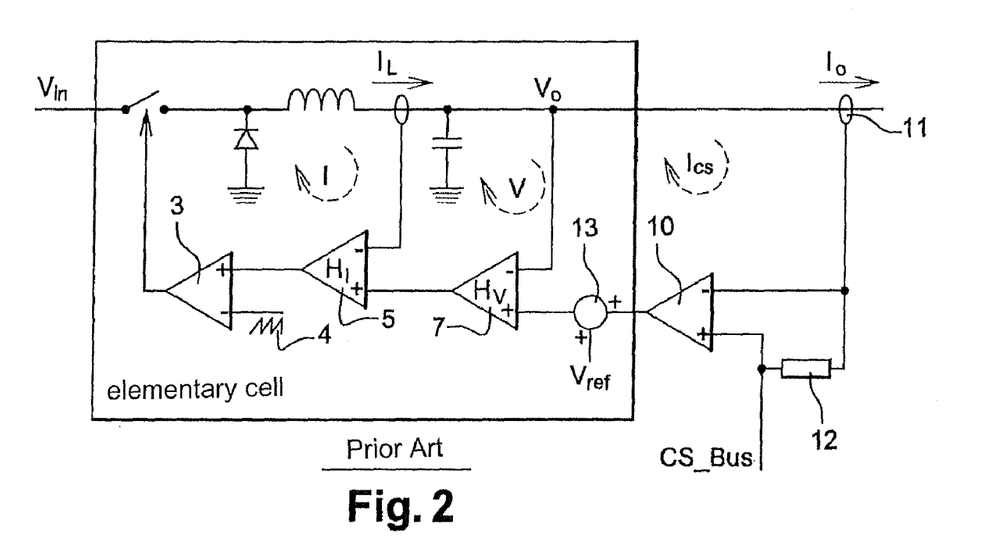
FIG. 2 shows a schematic view of an elementary cell using a current loop located after the voltage regulation loop of the cell discussed above.
Figure 3A:
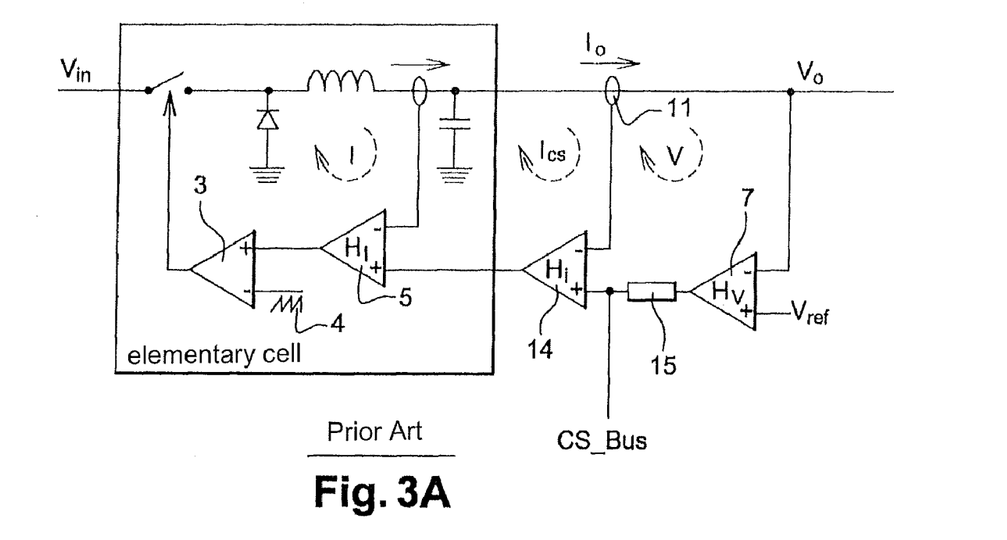
FIGS. 3A and 3B show schematic views of an elementary cell using a current loop located in front of the voltage regulation loop of the cell discussed above.
Figure 3B:
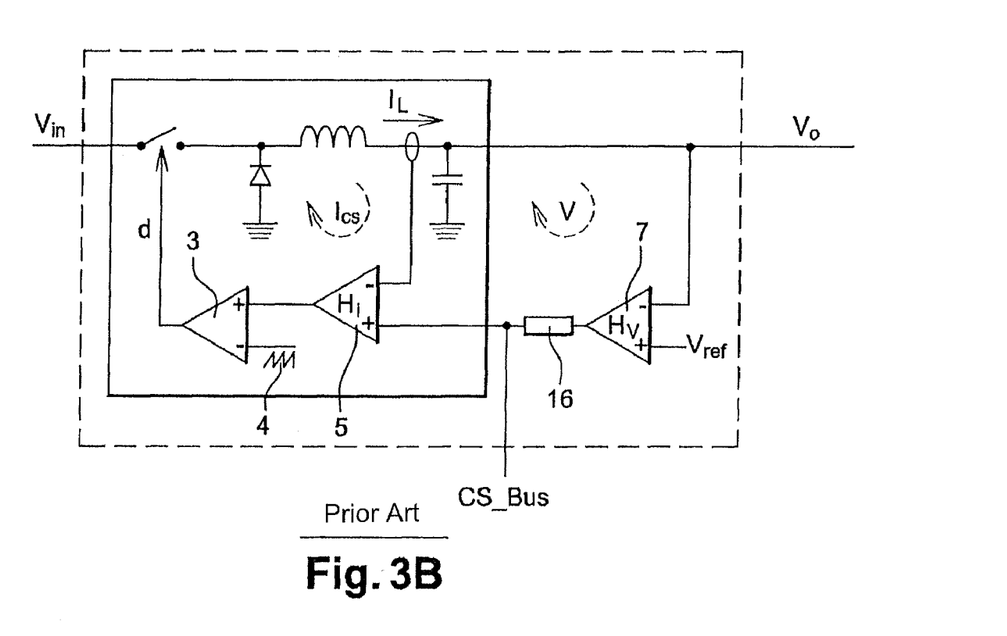

A first main embodiment using a current loop located after the voltage regulation loop of the cell (that will be called OLR according to the English terminology, outer loop regulation) is shown in FIG. 2, and a second main embodiment using a current loop located in front of the voltage control loop of the cell Inner LOOP Regulation (ILR) is shown in FIGS. 3A and 3B.

The OLR, outer loop regulation, principle shown in FIG. 2 consists of adding to each converter a current loop after the voltage loop, but not as fast as the basic cell loops, to distribute the loads between the different converters.

The OLR regulation loop has an input path with an amplifier 10 that receives on its negative input path a measurement 11 of the output current of the cell and on its positive input CS_Bus information common to converters connected in parallel.

It also has a component 12 that makes it possible to configure different operating modes, which is connected between the two inputs of each of the amplifiers 10.

The error measured between the output current of the converter and the CS_Bus path is then added to a reference voltage $V_{ref}$ at a summer 13, thus making it possible to drive the cell of a converter based on the currents of the other converters and to connect the converters in parallel.

The principle of the ILR loop shown in FIGS. 3A and 3B is to add a current loop in front of the voltage loop of the elementary cell to distribute the loads between the converters.

The bus on which the information travels, the CS_Bus, then handles the voltage error difference between the converters.

FIG. 3A is to a diagram in which an amplifier 14, inserted between the second 5 and third 7 amplifiers of the cell, receives on its negative input a measurement 11 of the output current of the cell and on its positive input the output of the third amplifier connected, according to the method chosen, via a component 15 to the CS_Bus information common to the converters.

It is also possible, as shown in the diagram in FIG. 3B, to use only one loop to control the current and distribute the currents, with the CS_Bus information connected via a component 16 to the output of the third amplifier 7 of the cell, and the combination of errors is introduced directly into the second amplifier 5.

In the case of this diagram, it is necessary to find a compromise between regulating and the distributing the load.

Depending on the type of component 12, 15 or 16 located on the CS_Bus path, the function is based on three principles, an automatic master principle (AM), an average program principle (AP) and a dedicated master principle (DM).

Figure 4:
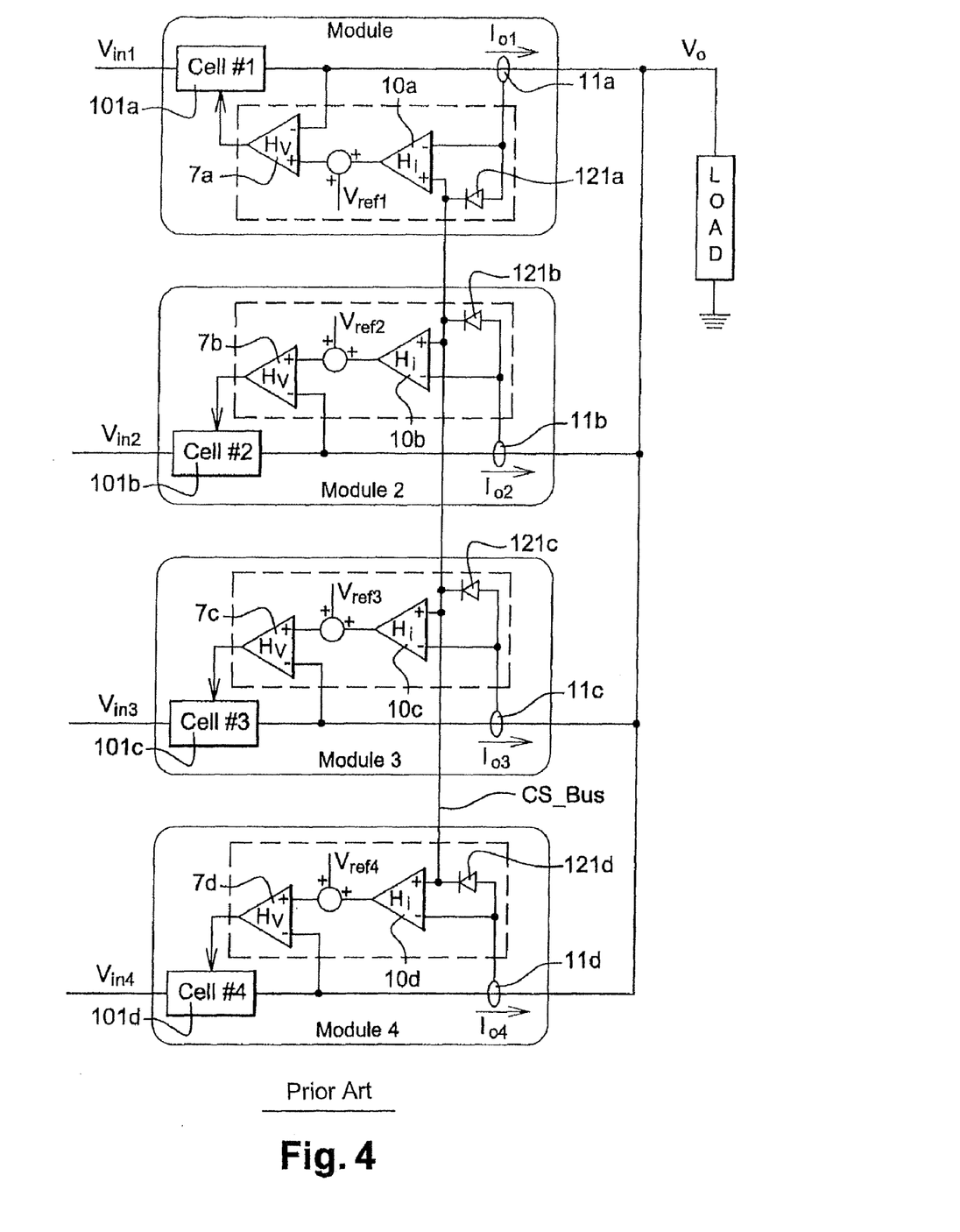
FIG. 4 is a schematic view of an regulation circuit for four generators using the automatic master-type outer loop regulation discussed above.
Figure 5:
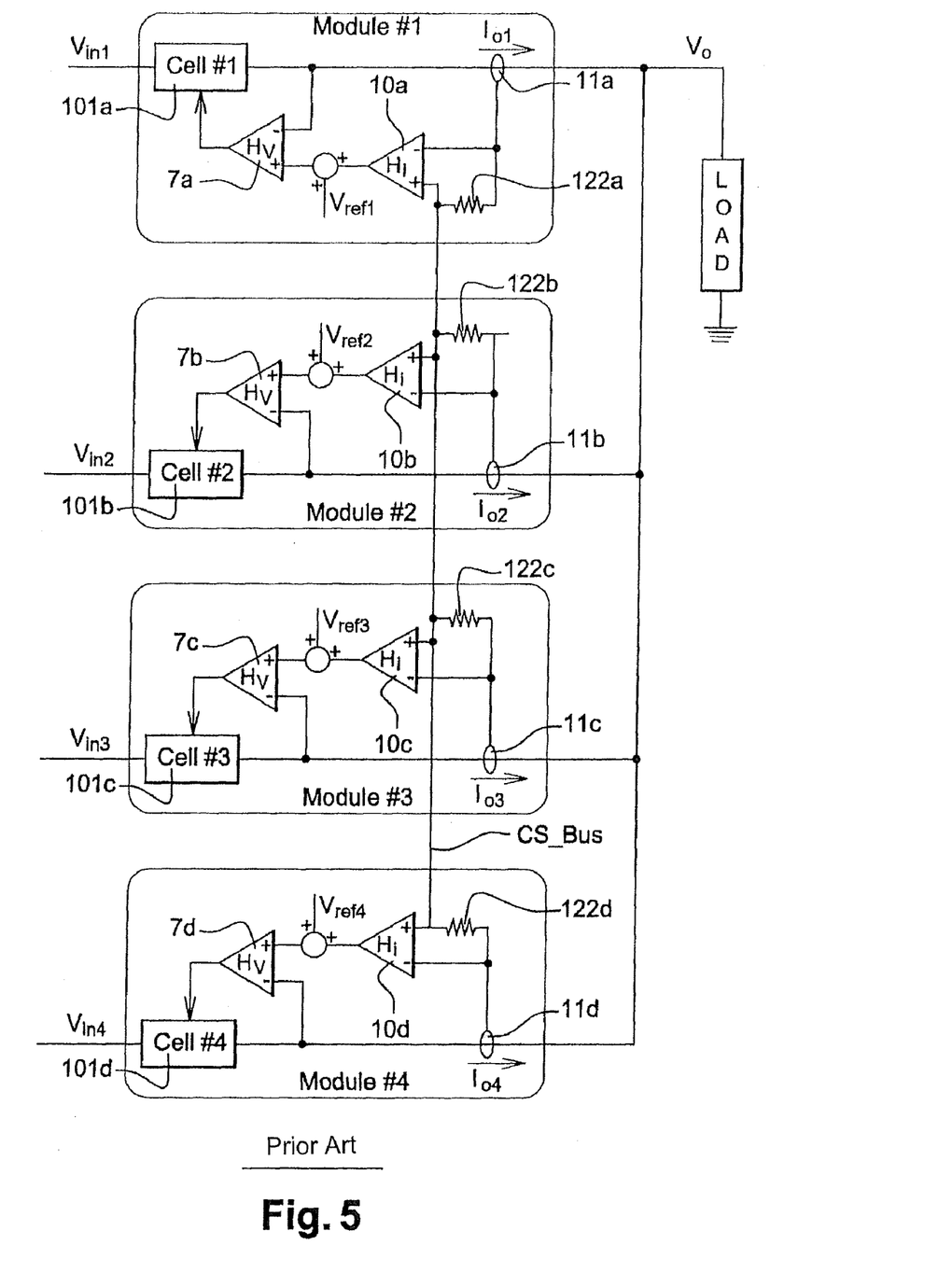
FIG. 5 is a schematic view of a regulation circuit for four generators using the automatic master-type outer loop regulation discussed above, for which the setting is an average of the currents measured on all the converters.
Figure 6:
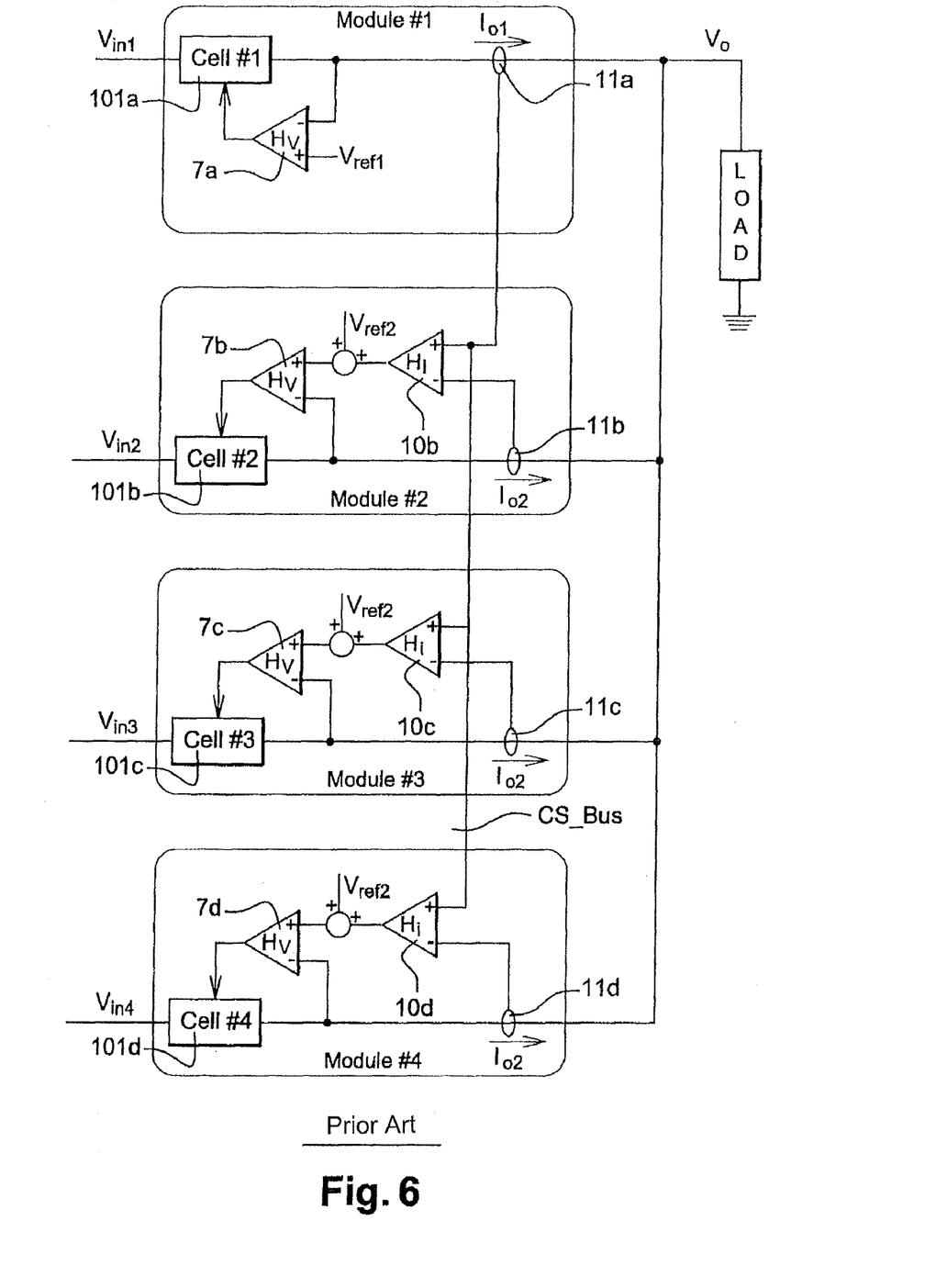
FIG. 6 is a schematic view of a regulation circuit for four generators using outer loop regulation with the dedicated master regulation principle discussed above.
Figure 7:
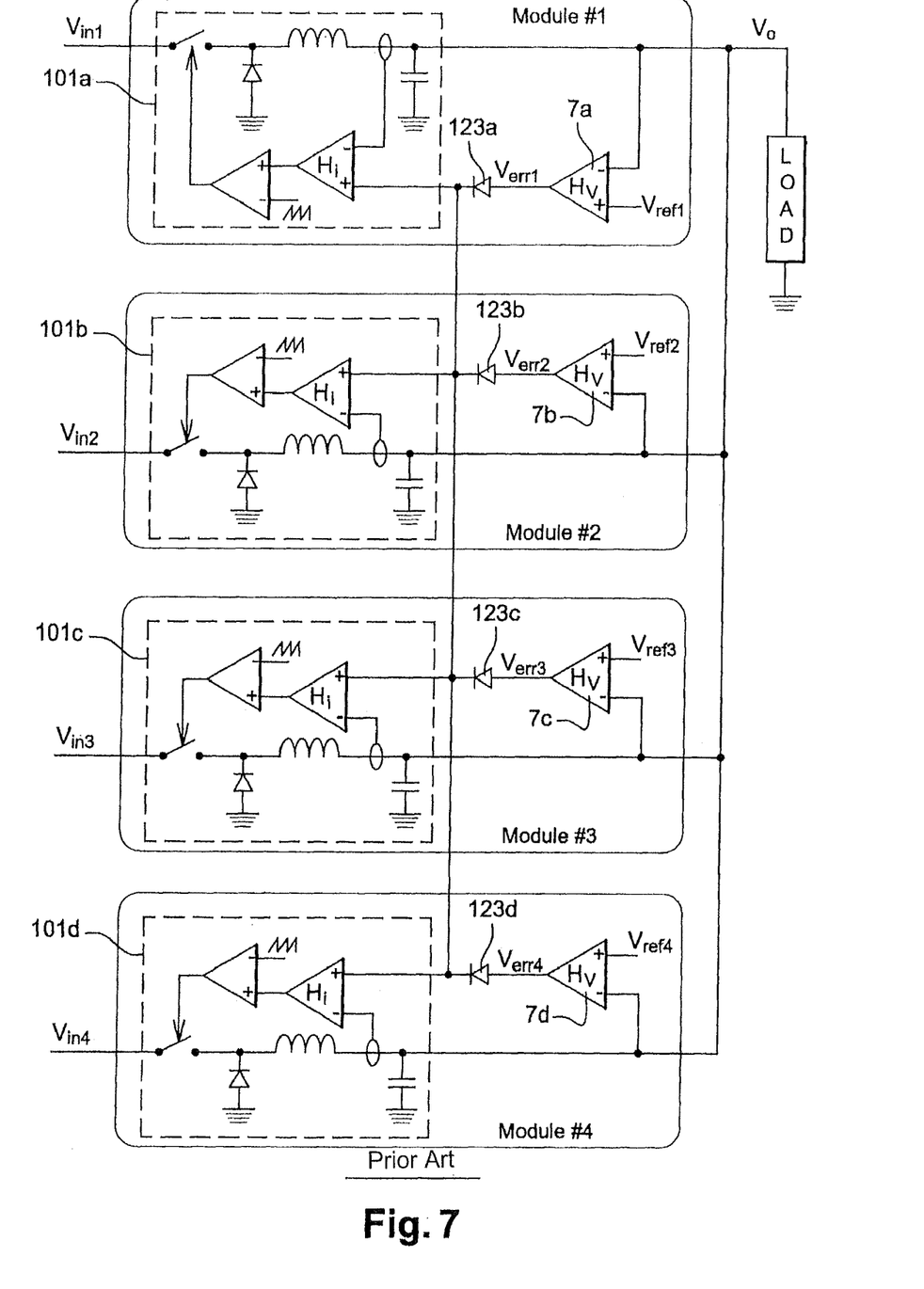
FIG. 7 is a schematic view of a regulation circuit for four generators using internal loop regulation with a CS_Bus path operating on the automatic master principle discussed above.
Figure 8:
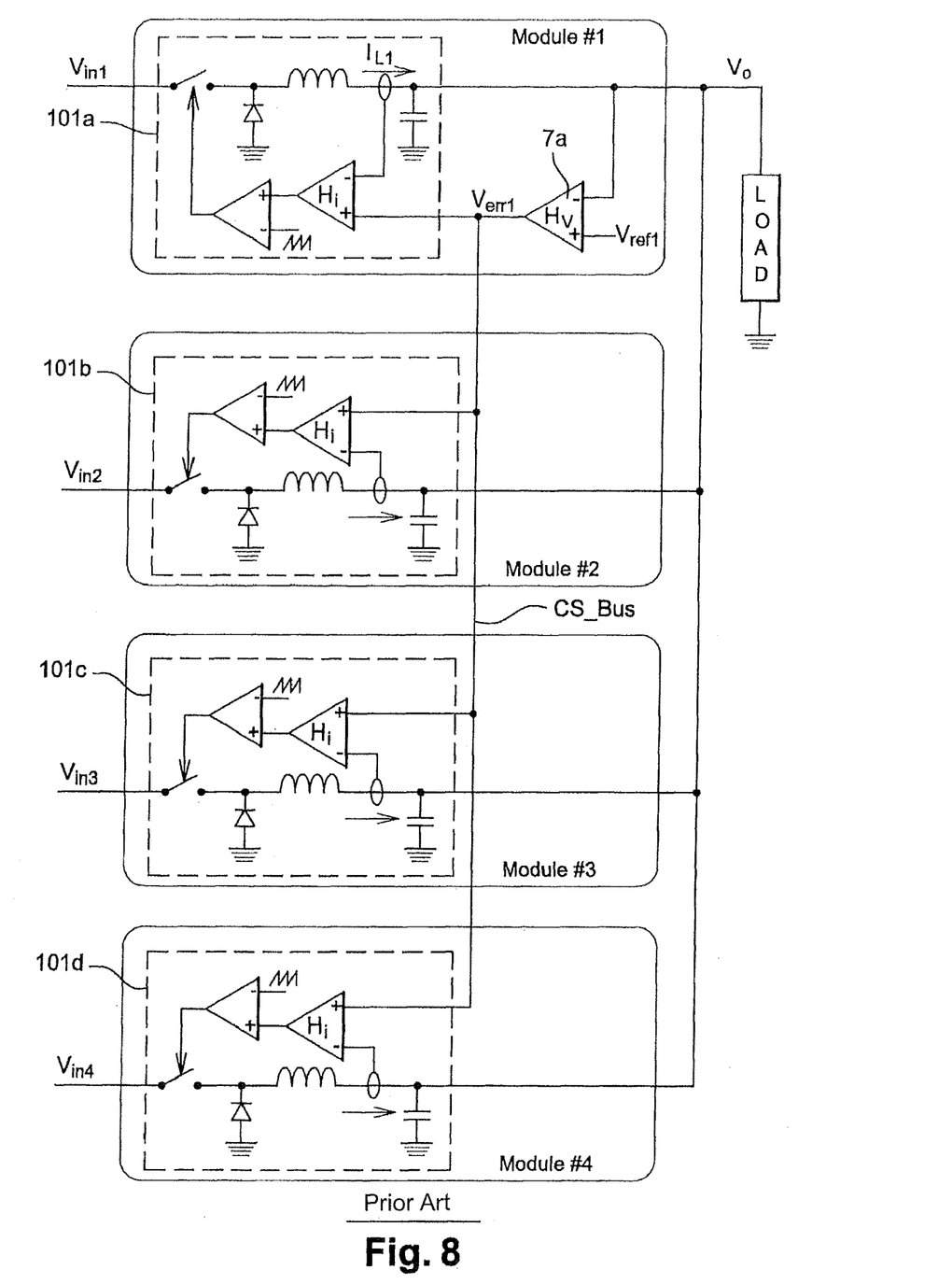
FIG. 8 is a schematic view of a regulation circuit for four generators using internal loop regulation with a dedicated master as discussed above.

The operating principles AM, AP and DM on the CS_Bus path for the OLR adjustment mode are shown in FIGS. 4 to 6, respectively, while the regulation principles AM and DM for the ILR loop are shown in FIGS. 7 and 8.

The example in FIG. 4 is for an OLR regulation, outer loop regulation, type AM, automatic master, shown coupling four generators; the unit cells 101a to 101d correspond to the elementary cell 1 in FIG. 1 in which the third amplifier 7, giving a voltage comparison measurement, was extracted from the cell as being part of the regulation loop.

This amplifier marked 7a to 7d for each unit cell receives on its negative input a measurement of the output voltage of the cell and on its positive input the sum of the reference voltage, $V_{ref1}$ to $V_{ref4}$ with the output of an amplifier 10a to 10d supplying a comparative voltage representative of the difference in current coming out of the cell concerned with a maximum current value supplied by all of the cells.

The amplifiers 10a to 10d receive on their negative input the measurement 11a to 11d of the current from the elementary cell to which they are connected and, on their positive input, the CS_Bus value corresponding to the measurement of the largest current supplied by one of the cells; diodes 121a to 121d let the converter with the highest output current play the role of master, and the other converters receiver error information in current, for example for converter No. 2 if converter No. 1 is master, from value Io1-Io2 in addition to voltage error information from amplifier 7b, which is associated with it.

The same is true of the third and fourth converters, which receive the error information Io1-Io3 and Io1-Io4, respectively, in the same configuration.

The advantage of this plan is that if one converter breaks down, the other or others continue to operate.

On the other hand, this plan causes a ripple between the output currents of the converters which will take turns.

In the example in FIG. 5, the OLR+AP type, thanks to a summer setup, the average of the measurements 11a to 11d of output currents of cells Io1 to Io4 is compared in the amplifiers 10a to 10d of each cell to the measurement of the output current of the cell to generate a voltage setting added to a reference voltage for the cell.

The electrical diagram for the OLR+AP setup is the same as that for the OLR+AM diagram in FIG. 4 with the difference that the diode is replaced by a resistor, and so it is not the converter that measures the highest current that sends the setting to the others, but an average of the currents measured from of all the converters that constitutes the setting.

The advantages of this principle are that it does not create any ripple between the converter currents and that it allows a precise distribution of the converter loads; the disadvantages are that if one of the converters fails, the system supplies the wrong current value and stops, and it is difficult to regulate the system.

The example in FIG. 6 is a diagram of OLR, outer loop regulation, with the dedicated master adjustment principle DM.

According to this principle, the first cell 101a corresponds to a master converter whose current measurement 11a will be compared with the current measurement 11b to 11d of each of the other cells at the amplifiers 10b to 10d to offset said other cells.

In this method, a converter operates in the traditional way and autonomously as the master and sends its current setting by the CS_Bus to the other converters which are referenced at its level.

The advantage of this setup is its simplicity and stability; on the other hand, it is often limited to two "Buck" converters in voltage mode.

The disadvantage of this type of configuration is that loss of the master causes loss of the system.

The example in FIG. 7 corresponds to the ILR internal loop principle with the CS_Bus path operating on the automatic master AM principle.

The CS_Bus path transports the most important voltage error information from one of the converters in relation to the others due to the presence of the diodes 123a to 123c at the output of the comparators 7a to 7d of the common output voltage of the converters with a reference voltage $V_{ref1}$ to $V_{ref4}$.

In this case, the highest voltage error of the four loops is the one that is sent to the four converters via the bus.

This setup is still theoretical and not used in products on the market.

The same is true of the diagram in FIG. 8, which corresponds to ILR, internal loop regulation, with dedicated master DM, for which a single converter controls the others via an amplifier 7a receiving the output voltage from all the converters and a reference voltage $V_{ref1}$ to supply a common error voltage to the four cells 101a to 101d.

According to this diagram, a single converter operates in the traditional way, autonomously (master converter), and sends its voltage setting to the other converters (slave converters) which do not have their own voltage loops and which are referenced on the master converter.

This is a simple, stable setup and the most widespread scheme in pulse-width modulation systems PWM for two sources.

On the other hand, the consequences of a failure must be analyzed; specifically, the loss of the regulation system must be considered if a failure affects the control loop.

What is more, since no structure of this type exists in the trade for more than two sources, the only possible embodiment uses discrete components, which results in loss of place and reduced mean time between failures (MTBF).

These systems also cannot handle cases of failure.

Due to avionic constraints, which require using setups in current mode to facilitate the limitation of currents in the event of a short circuit, the solutions for mounting in voltage mode are not usable.

In addition, the disadvantages for each method listed above are problems, such as being complex to use and manage cases of failures.

What is more, there are no monolithic PWM components that meet the needs above and handle more than two converters, which means this function must be performed either by using discrete components or by adapting the existing ones.

Starting from this state, disclosed embodiments are aimed at creating a device for balancing power generators with a plurality of converters, each having an elementary conversion cell and a simple, stable regulation loop using regulation in current mode.

To do so, the disclosed embodiments provide a balancing device for power generators having a plurality of converters, each having an elementary conversion cell equipped with a switch controlled by a comparator receiving, on one of its inputs, a control ramp and, on the other input, a voltage that comes from a control amplifier, for which the control amplifiers, receiving on their negative input a measurement of the current from the cell, have their positive input connected to a regulation loop including a common CS_Bus path, with this CS_BUS directly connecting the positive inputs of the control amplifiers to transductance amplifier outputs, associated with the elementary conversion cells, and receiving on their negative input, the output voltage of all the converters and on their positive input one reference voltage per cell.

Advantageously, the outputs of the transconductance amplifiers are directly connected in parallel and supply a current proportional to the sum of the errors out of the output voltage of all the converters in relation to the reference voltages.

The advantages of the disclosed embodiments are that it is simple to mount, each cell is independent and it is tough in the event of a simple failure.

Other characteristics and advantages of the disclosed embodiments will be evident from reading the following description of one non-limiting example, accompanied by the drawings:

BRIEF DESCRIPTION OF THE DRAWINGS

FIG. 4 is a schematic view of a regulation circuit for four generators using the automatic master-type outer loop regulation discussed above;

DETAILED DESCRIPTION

Figure 9:
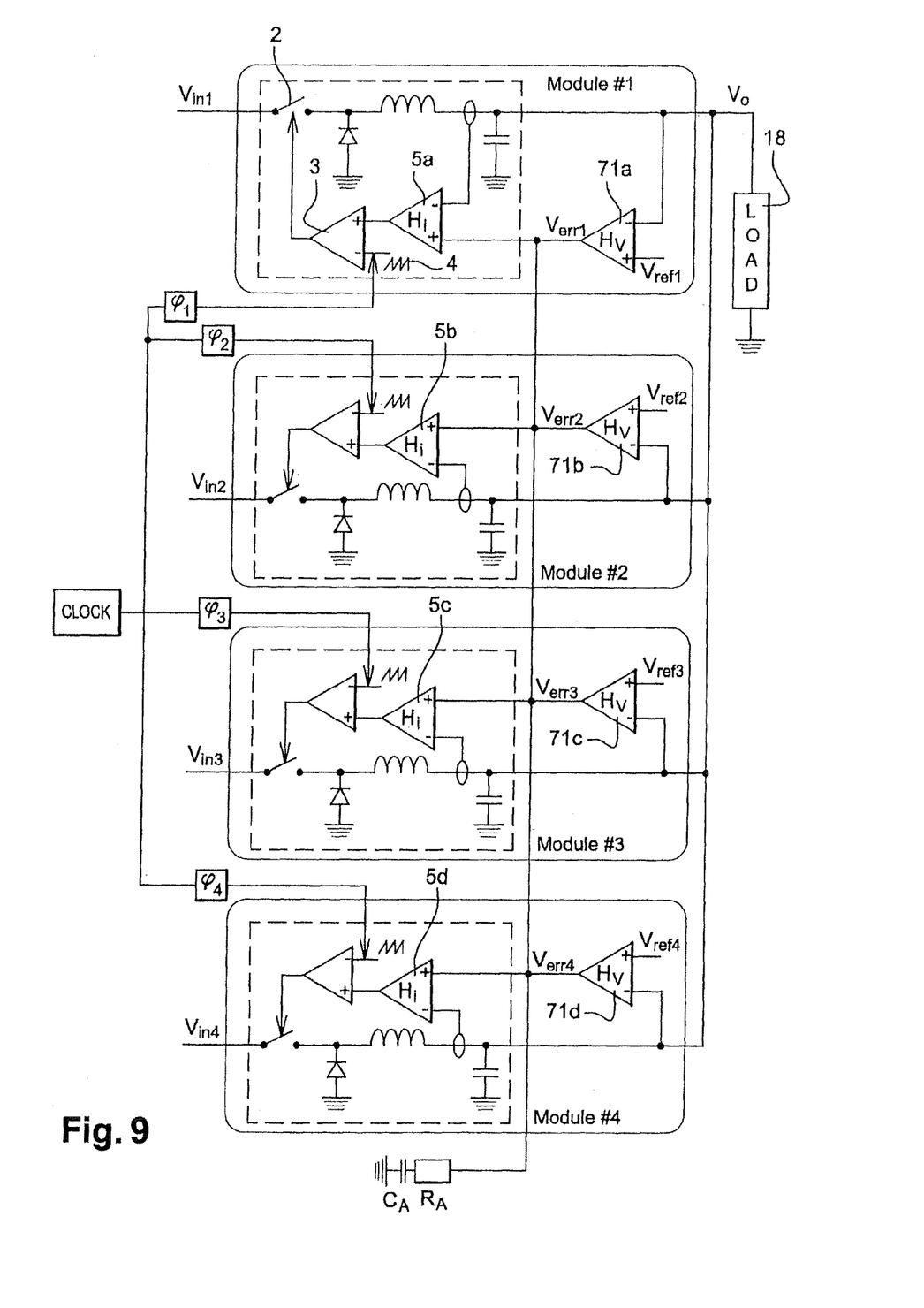
FIG. 9 is a schematic view of a regulation circuit for four generators using the regulation in the disclosed embodiments.

The device for balancing power generators shown in FIG. 9 has a plurality of converters designed to make it possible to couple generators to supply a common load 18.

The generators, not shown, numbering four in the example, supply an output voltage Vin1, Vin2, Vin3, Vin4.

They are each connected to a converter circuit, each having an elementary conversion cell equipped with a switch 2 controlled by a comparator 3.

Since each generator supplies one converter, there are therefore four converters in the example.

The switches make it possible to connect the generator to a self-charging/condenser circuit, switch 2, the comparator 3 and the load circuit forming an elementary cell, as described previously in relation to the prior art.

The comparator 3 receives on one of its inputs, the negative input in this instance, a sawtooth ramp 4, and on the other input, a voltage that comes from a control amplifier 5a, 5b, 5c, 5d so as to close the switch when it is necessary to load the filter of the load circuit.

Each cell has a control amplifier and the control amplifiers receive on their negative input a measurement of the load current of the cell and on their positive input the signal of a CS_Bus path common to the four converters.

The control amplifiers are part of a regulation loop including the common CS_Bus path; the latter, contrary to the devices in the prior art, directly connects the positive inputs of the control amplifiers 5a, 5b, 5c, 5d, . . . to the outputs of transconductance amplifiers 71a, 71b, 71c, 71d . . . associated with the elementary conversion cells and receiving on their negative input the output voltage from all the converters and on their positive input a reference voltage Vref1, Vref2, Vref3, Vref4 . . . per cell.

In another special embodiment, the reference voltages Vref1, Vref2, Vref3, Vref4, . . . per cell are identical.

Note that the example shown is in the context of a setup with four generators, but the principle of the disclosed embodiments can be generalized to more than four generators.

According to the disclosed embodiments, said amplifiers associated with the elementary conversion cells are transconductance amplifiers supplying an output current proportional to the voltage difference seen at their inputs and having a high output impedance.

The use of such transconductance amplifiers has the advantage of permitting direct parallel connection of these amplifiers to create a sum of currents, voltage error measurements that come from a comparison of the voltage at the level of the load 18 of the device with the reference voltages Vref1, Vref2, Vref3, Vref4 of the cells.

In this way, no component, such as a diode or resistor is necessary, and for each amplifier 71a to 71d an output current is obtained that is proportional to the differences read on its inputs.

The outputs of the transconductance amplifiers 71a, 71b, 71c, 71d associated with the elementary conversion cells are directly connected in parallel and supply a current proportional to the sum of the errors on the output voltage of all the converters compared to the reference voltages Vref1, Vref2, Vref3, Vref4.

To obtain a voltage setting representative of the sum of the currents generated by the transconductance amplifiers, the CS_Bus path is loaded with a resistor $R_A$ determining a voltage proportional to the current that comes from the transconductance amplifiers and hence proportional to the sum of the currents representative of errors.

To achieve integration, the CS_Bus path is loaded with a capacitor $C_A$ making an integral correction from the sum of the currents that come from the transconductance amplifiers.

Advantageously, the resistor $R_A$ and the capacitor of the condenser $C_A$ are wired in series, and the high output impedance of the transconductance amplifiers does not require the voltage at the level of the CS_Bus path, but permits this path to be positioned at an intermediate voltage that is a function of the bridge created on one side by connecting the output impedances of amplifiers 71a to 71d in parallel and on the other by the resistor $R_A$ and the capacitor $C_A$.

More generally, the resistor $R_A$ and the capacitor $C_A$ are wired in series so as to create a proportional/integral type of correction on the sum of the currents that come from the transconductance amplifiers.

As for the diagrams in the prior art, the sawtooth ramps are generated by a clock 17 that controls the converters.

The control ramps of the converters are preferably staggered by phase displacements $\phi 1$, $\phi 2$, $\phi 3$, $\phi 4$ between each cell.

The ideal value of the phase displacement is a value of 360° divided by the number of cells to optimize the smoothing of the output voltage of all the converters.

The disclosed embodiments apply particularly to a power supply system having a balancing device according to the principle in the disclosed embodiments and an aircraft having such a power supply system.

The disclosed embodiments are not limited to the example shown, and the number of converters and generators can be different from four.

The invention claimed is:

1. A balancing device for power generators, having a plurality of converters, each including an elementary conversion cell equipped with a switch controlled by a comparator receiving, on one of its inputs, a control ramp and, on the other input, a voltage that comes from a control amplifier, wherein the control amplifiers receive on their negative input a measurement of the current from the cell, have their positive input connected to a regulation loop having a common CS_Bus path, and the CS_Bus path directly connects the positive inputs of the control amplifiers to the outputs of transconductance amplifiers, associated with the elementary conversion cells and, receiving on their negative input the output voltage of all the converters and on their positive input one reference voltage (Vref1, Vref2, Vref3, Vref4) per cell.

2. The balancing device for power generators according to claim 1 for which the reference voltages (Vref1, Vref2, Vref3, Vref4) are identical.

3. The balancing device for power generators according to claim 1, for which the outputs of the transconductance amplifiers associated with the elementary conversion cells are directly connected in parallel and supply a current proportional to the sum of the errors on the output voltage of all the converters compared to the reference voltages (Vref1, Vref2, Vref3, Vref4).

4. The balancing device according to claim 1 for which the sawtooth ramps are generated by a control clock of the converters.

5. The balancing device according to claim 4 for which the control ramps of the converters are staggered ($\phi1, \phi2, \phi3, \phi4$) between each cell.

6. The balancing device according to claim 5 for which the control ramps of the converters are staggered by a value of 360° divided by the number of cells.

7. The balancing device according to claim 1 for which the CS_Bus path is loaded with a resistor $R_A$ determining a voltage proportional to the current that comes from the transconductance amplifiers.

8. The device according to claim 1 for which the CS_Bus path is loaded with a capacitor ($C_A$) producing an integral correction out of the sum of the currents that come from the transconductance amplifiers.

9. The balancing device according to claim 7 for which the resistor $R_A$ and a capacitor ($C_A$) are wired so as to produce a proportional/integral-type of connection out of the sum of the currents that come from the transconductance amplifiers.

10. The balancing device according to claim 7 for which the resistor $R_A$ and the capacitor ($C_A$) are wired in series.

11. A power supply system having the balancing device according to claim 1.

12. An aircraft having the power-supply system according to claim 11.

* * * * *